Dec. 31, 1940. H. P. HANSON 2,227,187
DECORATIVE WREATH
Filed May 23, 1938
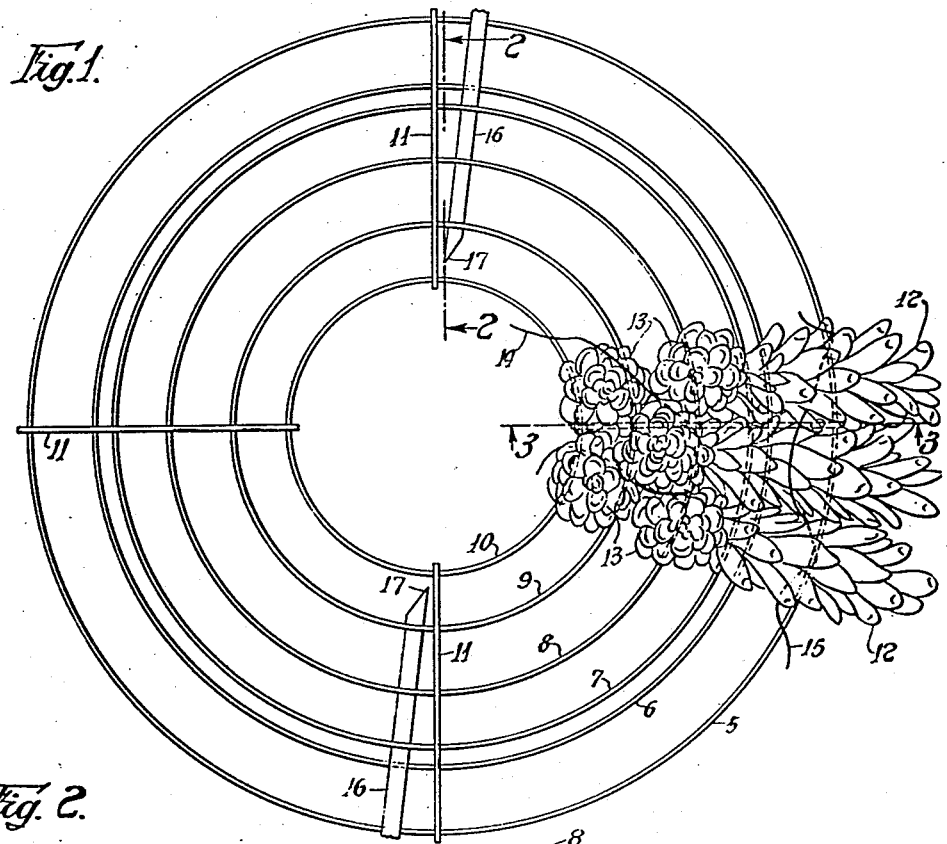
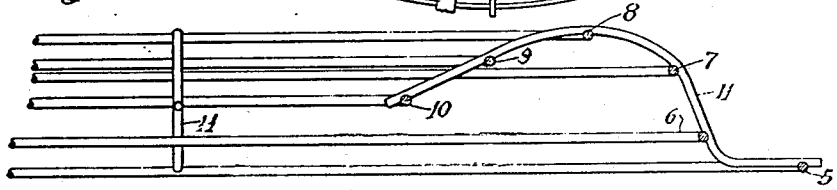
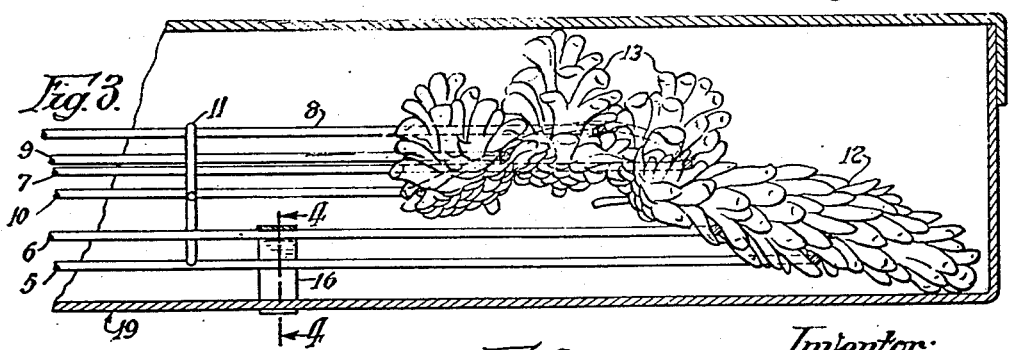
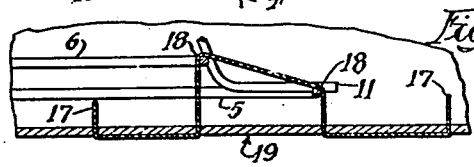
Inventor:
Hans Peter Hanson,
By: Winfield Williams
Attorney.

Patented Dec. 31, 1940

2,227,187

UNITED STATES PATENT OFFICE 2,227,187

DECORATIVE WREATH

Hans Peter Hanson, Chicago, Ill.

Application May 23, 1938, Serial No. 209,547

6 Claims. (Cl. 41—12)

My invention is an improvement in ornamental wreaths which are adapted to utilize therewith certain specific types of natural products which are characterized by their tendency to interlock or interbarb, such as cones and ruscus.

My primary object is a basic structure for a wreath which is constructed of a simple inexpensive combination of semi-resilient wires so organized that they take a decoration which is self sustaining, and can be very economically treated as a finished unit to coloring.

A further object is the combination in a wreath of a basic frame of semi-resilient wires adapted to take a mounting thereon of natural products such as cones and the like which interlock and interbarb each other and the frame, so as to be subject to finished color decoration as a unit.

A major object is a completed wreath which can be dipped as a unit in a fluid which renders it water-proof and weather-proof.

Another of the objects of the invention is to produce a wreath of attractive appearance which may be quickly assembled and be of more lasting quality.

Another object of this invention is to provide a structure which resiliently and automatically supports a wreath made of natural products which may be easily assembled with a minimum of effort by unskilled labor.

Still another object of this invention is to so assemble a wreath on a frame where they will remain permanently in place without the necessity of tying them to the frame.

Yet another object of the invention is to provide a wreath well adapted to be packed for secure shipment in boxes to stand rough handling without damage and be mounted on a permanent independent support.

Other objects and advantages of this invention will become apparent as I proceed with the specification.

In the floral art wreaths have in some form or other involved or included a base portion consisting of some kind of cushion or bolster material which was devised for the attachment or support of the decorative features. In a former patent, Number 1,657,750, I advanced the art by a simple effective means of broadening to an unlimited extent the base for a decorative wreath without altering or eliminating the expensive cushion structure. My present invention eliminates the expensive cushion base, and expensive manner of attaching decorative objects to the base; and presents a more highly commercial article in the florist art.

In the art conifers and ruscus play an important part in decoration, and in imitation of certain flowers, and they have certain peculiar characteristics which render them capable of coaction with each other. Pine cones have scales or pids which are normally resistant to moisture and tend to close up under excessive moisture. The combination of this invention provides a wreath structure which secures the advantages of the cone and practically overcomes its weakness. When the cones become wet their scales tightly grip the resilient wires, and as they dry they expand into frictional contact with the wires and with each other. Ruscus has a normally barbing characteristic.

In the drawing:

Fig. 1 is a horizontal plan view of a wire frame with several cones in place thereon, Fig. 2 is an enlarged vertical section taken on the line 2—2 of Fig. 1, Fig. 3 is an enlarged vertical section taken on the line 3—3 of Fig. 1, and Fig. 4 is a vertical section on the line 4—4 of Fig. 3.

The embodiment of the invention illustrated in the drawing consists of a resilient wire frame formed of concentric rings or loops 6, 7, 8, 9 and 10 respectively. The ring 8 is located elevationally above all the others with rings 6 and 7 spaced elevationally outside of and below while the rings 9 and 10 are spaced inside of and below the ring 8. The cross members 11 are substantially rigid and so shaped as automatically to retain the resilient rings in the above described position and are preferably welded securely to each ring. The several rings are resiliently related to each other and are substantially equally spaced apart therefrom so that decorative members will engage the rings 5, 6, and 7 and interbarb each other, thus being retained firmly in position thereby. When cones are used the whole form can be covered with long cones 12, and it may be enhanced by the use of a plurality of cones 13 which may preferably be inserted in the spaces between the other wire rings, 7 to 10 inclusive, of the frame. Cones are added to the frame in this fashion until the wires are completely hidden by them. As best shown in Fig. 3 the scales of each cone will not only engage at least two wires but will also further hold themselves in position by engaging the scales of other cones near them. It is a well known fact that pine cones at times blossom or expand their scales, while at other times they will contract or close them. Obviously in my improved wreath as the cones expand their scales will press themselves into closer engagement with each other and the wires. Then again, as their scales contract they will clamp more closely around their respective wires and retain themselves more firmly in position therewith.

If desired, light wire or threads 14 and 15 may be strung between some of the cones as shown in Fig. 1, to insure sustained integrity of the wreath under atmospheric changes. Metal strips 16 cut to form sharp ends as at 17 are welded to the wires 5 and 6 as indicated at 18 for a purpose soon to appear. A cardboard container used for shipment or storage of the finished wreath is indicated at 19. The sharp ends of the metal strips 16 are pressed through the bottom of the container from the inside thereof, then bent and returned through the bottom of the container from the outside thereof as shown in Fig. 4. This forms a fastening means for the wreath in the container which prevents the wreath from shifting therein and which will stand very rough handling without causing damage to the wreath. The strips 16, thoroughly concealed by the cones, may later very conveniently be utilized for hanging the wreath when it is not being used.

Wreaths so formed and decorated have become the most advanced and best recognized in the art; and they are peculiarly adapted to be economically treated to a decorative and protective coloring and coating by a simple dipping process which is accomplished by machinery, or even by hand, in a mere fraction of the time required by any other known process of wreath manufacture.

While in describing my invention I have referred in detail to the shape, arrangement and construction of the parts, it is to be understood that I do not wish to be limited to cones, but may use other natural products.

I claim:

1. In an article of manufacture an ornamental wreath comprising a frame of concentrically disposed horizontally spaced apart semi-resilient wires of varying diameters, a plurality of cross members each secured to each of the concentrically disposed wires for retaining them in spaced and resilient contour relation; cones mounted on and between said wires coacting with the resiliency of the wires.

2. In an ornamental wreath a basic frame of horizontally spaced apart resilient hoop wires of varying diameters, a plurality of cross members secured to each of the resilient wires for retaining them in spaced and resilient contour relation, a decorative mounting consisting of natural products such as cones and the like adapted to barb the resilient wires and interlock therewith, a fine flexible wire hiddenly interlaced with the hoops and the cones to insure the integrity of the wreath during variations of the atmosphere.

3. An article of manufacture constituting a wreath including a series of substantially evenly spaced apart resilient wire rings projected from a base ring in curved contour to an inturned reverse curve of lesser diameter rings, means for retaining the several rings of varying diameter in predetermined elevational contour, combined with a decorative mounting of natural products, such as cones, characterized by their capacity to normally barb the resilient wires and interlock therewith.

4. A wreath characterized by its being composed basically of a plurality of resilient wire rings elevationally spaced apart and resiliently coactive, combined with a mounting consisting of natural products having barbing propensities such as cone scales adapted to coact with the resilient wire rings and be automatically held on and therebetween.

5. An article of manufacture consisting of a basic body formation and a mounting of natural products such as cones and the like, the body being a plurality of resilient wire rings elevationally spaced apart around a central axis, there being means to support them apart in resilient relation to each other and automatically support thereon and between the rings the decorative mounting of natural products, a plurality of metal members welded to the basic ring adapted to attach the wreath to a medium of display.

6. An article of manufacture constituting a wreath consisting of a basic shaping frame of resilient wire loops spirally held in resilient relation by a plurality of rigid cross members, combined with a decorative mounting of natural products such as cones and the like whereby the decorative elements are securely held in permanent contact with the wire loops and their own interlocking.

HANS PETER HANSON.